INVENTORS
J TIM (NMI) GONZALES
THOMAS J. GRIFFIN

BY Wheeler, Wheeler, House & Clemency
ATTORNEYS

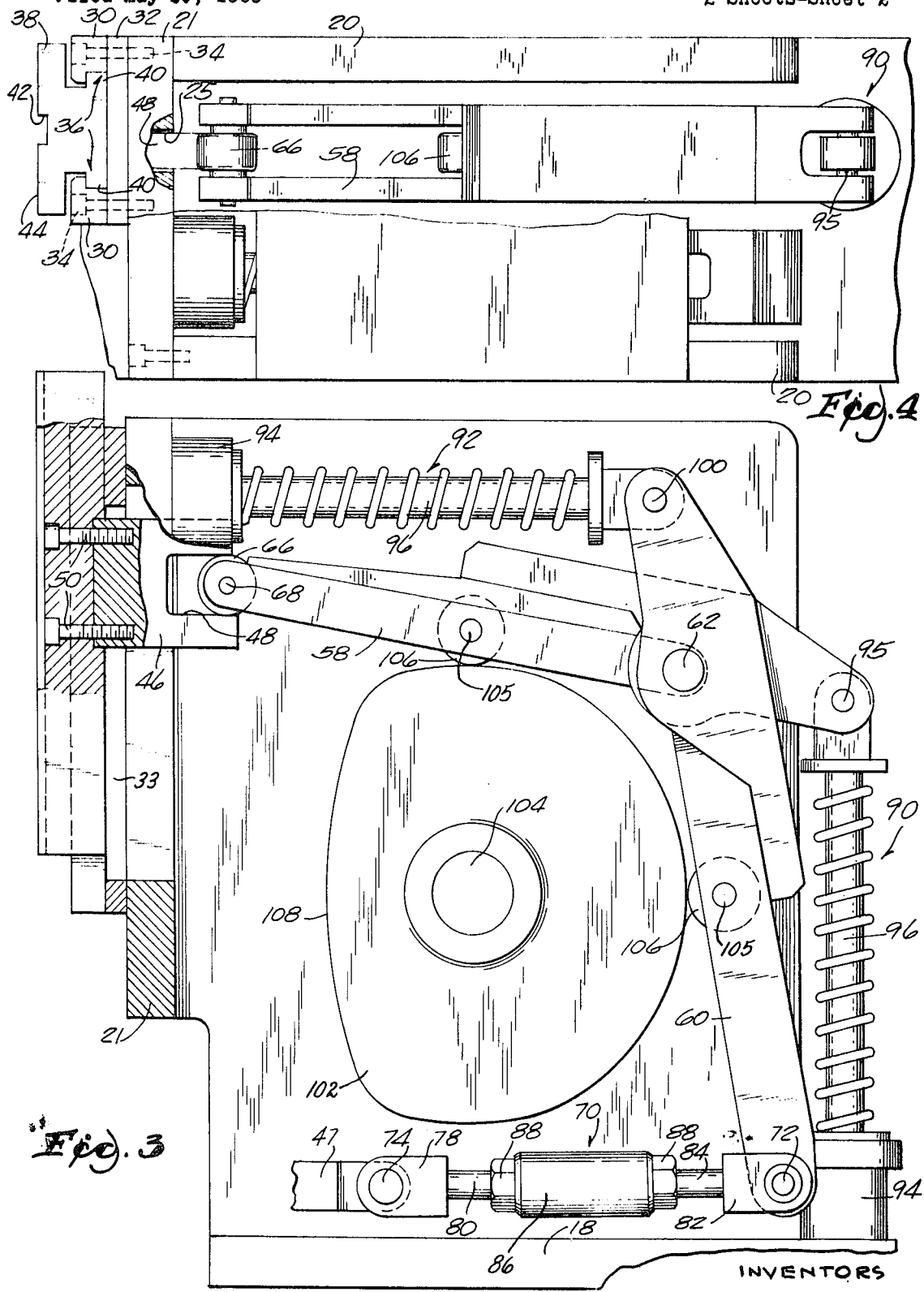

United States Patent Office 3,609,839
Patented Oct. 5, 1971

3,609,839
DOUBLE MOTION UNIT
J Tim Gonzales, Rockford, Ill., and Thomas J. Griffin,
 Fort Atkinson, Wis., assignors to Rockford Automation, Inc., Rockford, Ill.
Filed May 19, 1969, Ser. No. 825,842
Int. Cl. B23q 39/04
U.S. Cl. 29—51                                                    5 Claims

ABSTRACT OF THE DISCLOSURE

An apparatus for moving tools to perform an operation on a workpiece, said apparatus including a pair of tool holders for supporting tools, a pair of pivotally mounted lever arms operatively connected to move the tool holders through predetermined paths of motion, a pair of air springs operatively connected to said lever arms to provide the working force for the working stroke of each tool holder and a motor driven cam to control the motion of the lever arms, the motor driven cam being actuated in response to the movement of a workpiece to a work station adjacent the apparatus, or otherwise.

BACKGROUND OF THE INVENTION

The use of a cam controlled lever arm biased by a spring to control the motion of a tool toward and away from a workpiece has been used to provide a working force where the working force is not available directly. However, coil springs are generally used to provide the working force. The cycle of motion of the workholders has been controlled by various types of cam motion. None of these devices has sufficient flexibility to provide ready adjustment of the working force or the cycles of operation of the workholders.

SUMMARY OF THE INVENTION

The apparatus of this invention is used to perform a machining operation or an assembling operation on a workpiece which is carried on an assembly line and indexed in a step by step manner to a work station in front of the apparatus. The apparatus is provided with a pair of tools carried by tool holders that are moved through a predetermined cycle which includes a working stroke to perform an assembling or machining operation on the workpiece. Each of the tool holders is moved through the work stroke by an adjustable air cylinder which is preset to provide the proper work force for the particular operation which is to be performed on the workpiece. A selectively variable cam is used to control the motion of the tool holders toward and away from the workpiece and to build up the working force in the air springs for the work stroke. The tool holders can be used to carry any of a number of tools for performing assembling and/or machining operations. The motion of the cam can be varied to provide a single cycle of operation or multiple cycles of operation in each revolution of the cam. A cam controlled switch actuated timer is used to provided dwell times in the cycles of motion of the tool holders where longer periods of time are required to complete a cycle of operation.

Other objects and advantages will become apparent from the following description when read in connection with the accompanying drawings, in which:

FIG. 3 is a side view in section of the apparatus.

FIG. 4 is a top view partly broken away showing one of the lever arms.

DESCRIPTION OF THE INVENTION

Figure 1:
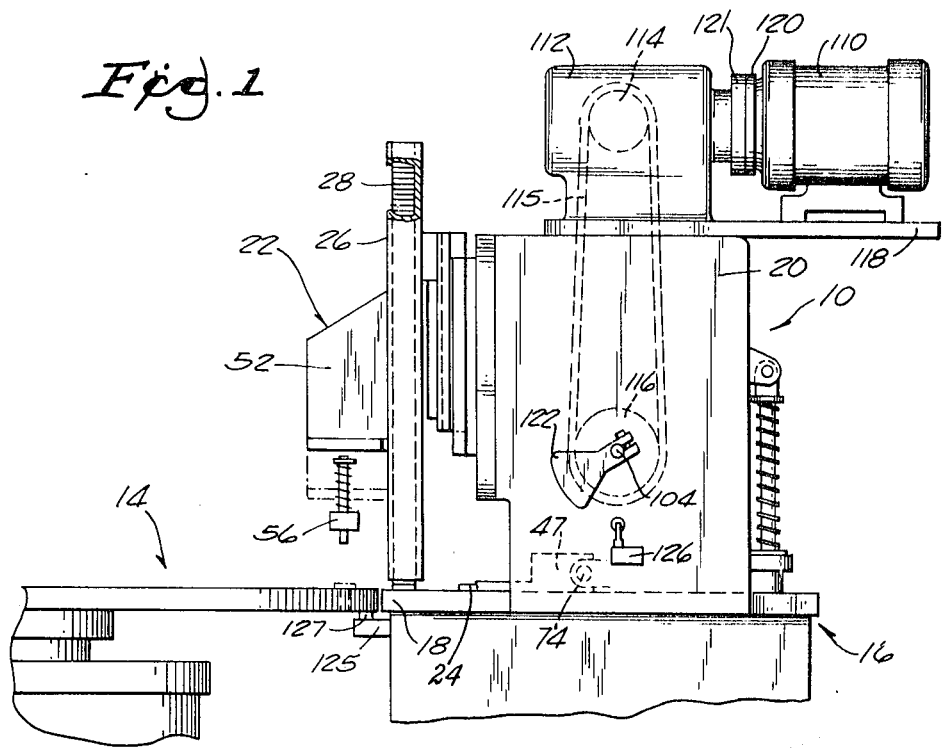
FIG. 1 is a side view in elevtion of the apparatus of this invention.
Figure 2:
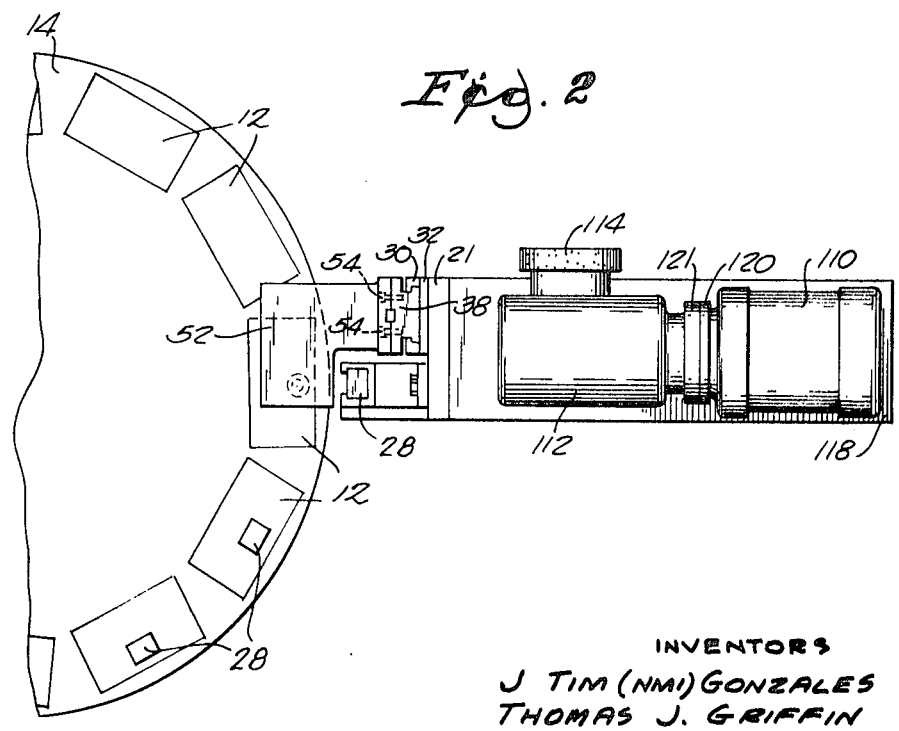
FIG. 2 is a top view of the apparatus showing a portion of a turntable.

Although the disclosure hereof is detailed and exact to enable those skilled in the art to practice the invention, the physical embodiments herein disclosed merely exemplify the invention which may be embodied in other specific structure.

The apparatus 10 of this invention serves as one station in a step by step assembly line to perform work, such as a machining operation or an assembling operation, on a workpiece 12. The workpiece 12 is shown carried on a turntable 14 which is indexed in a step by step manner to move the workpieces 12 to a work station at the apparatus 10. Although only a single apparatus 10 is shown in the drawing, any number of such apparatuses can be positioned around the turntable 14. Each of the apparatuses 10 can be readily adapted to perform one of a variety of assemblying or machining operations to complete the assembly of the workpiece 12 as the workpiece is moved in a step by step manner by the turntable 14.

In accordance with the invention, the apparatus 10 includes a base or support 16 having a bottom plate 18, sidewalls 20 and an end wall 21 having a vertically extending slot 25. The apparatus 10 is provided with means in the form of a pair of tool holders 22 and 24 to accommodate a variety of tools for performing an assembling operation or a machining operation on the workpiece 12. The tool holder 22 is supported by means of the base 16 for generally vertical movement and the tool holder 24 is supported by means of the base 16 for generally horizontal movement. Either of the tool holders 22 or 24 can be used to carry a part to the workpiece 12 and the other tool holder used to assemble the part to the workpiece 12 or for machining the workpiece 12 to accommodate the part. In the embodiment shown in the drawing, a magazine 26 is mounted on the sidewalls 20 to supply parts 28 to be assembled to the workpiece 12 to the tool holder 24. It should be understood that the magazine 26 could be mounted to supply the parts 28 to the tool holder 22 and a tool carried by the tool holder 24.

Means are provided on the end wall 21 for supporting the tool holder 22 for generally vertical movement with respect to the workpiece 12. Such means includes a pair of guide brackets 30 and a plate 32 defining guide grooves 36. The plate 32 is provided with a slot 33 and is secured to the end wall 21 by bolts 34. The tool holder 22 includes a slide block 38 having a pair of flanges 40 positioned for sliding movement in the guide grooves 36 and a yoke 46 having a slot 48 secured to the back of the slide block 38 by bolts 50. The yoke 46 projects through slot 33 in the plate 32 and slot 25 in the end wall 21.

Tools 56 are supported on the tool holder 22 for movement in the path of motion of tool holder 24 by means of an L-bracket 52 mounted on the outer surface 44 of the block 38. The L-bracket 52 is secured to the block 30 by bolts 54. The tool 56 is shown in the form of a spring biased tube mounted on the bracket 52, however, any number of different tools can be used with the apparatus.

Means are provided on the plate 18 for supporting the tool holder 24 for generally horizontal motion with respect to the workpiece 12. Such means may include a guide groove provided in the top surface of the plate 18. The tool holder 24 includes a carriage 47 which may be provided with a rib or guide means positioned in the optional groove (not shown). The carriage 47 is moved beneath the magazine 26 to pick a part 28 and carry the part 28 to a position over the workpiece 12.

The tool holders 22 and 24 are moved or translated in a direction to perform an assembling or machining operation by means of a pair of levers 58 and 60. The levers 58 and 60 are pivotally mounted on a common pivot pin 62 positioned in apertures in the walls 20. The lever 58 is connected to the slide block 38 by means of a roller 66 mounted on a pivot pin 68 provided on the end of the lever 58. The roller 66 extends into the slot 48 in the yoke 46. Pivotal movement of the lever 58 about the pivot pin 62 is translated to a linear movement of the tool holder 22 toward the workpiece 12.

Lever 60 is connected to the tool holder 24 by means of an adjustable link or coupling 70. The coupling 70 includes a clevis 78 having a left hand threaded section 80 and a clevis 82 having a right hand threaded section 84. The clevises 78 and 82 are connected by a turnbuckle 86 which can be turned to vary the distance between the clevises. The coupling 70 is connected to the lever 60 by a pivot pin 72 and to the carriage 47 by a pivot pin 74. Adjustment of the distance between the carriage 47 and lever 60 can be made by turning the turnbuckle 86. Lock nuts 88 are provided on either end of the turnbuckle 86 to lock the turnbuckle in position.

The working force for producing a working stroke in the cycle of motion of the tool holders 22 and 24 is provided by means of air springs 90 and 92 which are operatively connected to the lever arms 58 and 60, respectively. The air springs 90 and 92 each include a sealed cylinder 94 and a piston rod 96. Air in the cylinder 94 is compressed by the movement of the rod 92 into the cylinder to store up energy for the working stroke of the tool holders. Desirably the pressure in the air cylinder is maintained and re-inforced by introducing air at a pre-set pressure behind the piston. The piston rod 96 of air spring 90 is connected to the end of lever arm 58 by means of a pin 95. The air spring 90 provides a constant working force on the end of the lever arm 58 which tends to rotate the lever arm 58 counterclockwise in the drawing. The piston rod 96 of air spring 92 is connected to the end of lever arm 60 by means of a pin 100. The air spring 92 provides a constant working force on the lever arm 60 which tends to rotate the lever arm 60 clockwise in the drawing. The amount of force provided by each of the air springs 90 and 92 can be adjusted by prepresurrizing the air cylinders 94.

Means are provided for retracting and for controlling the working stroke of the tool holders in the form of a cam 102 mounted on a cam shaft 104 which is journalled in the walls 20. Each of the levers 58 and 60 is provided with means for following the motion of the cam 102 in the form of a cam roller 106 mounted on a pivot pin 105. The cam rollers 106 are located between the tool holders 22 and 24 and the pivot pin 62 in a position to ride on the surface 108 of the cam 102. The rollers 106 are biased into engagement with the cam surface 108 by means of air springs 90 and 92. The cam surface 108 shown in the drawing will provide a sequential movement of the tool holders 22 and 24 depending on the direction of rotation of the cam 102.

The cam 102 is driven by means of an electric motor 110 connected to a reduction gear 112 having a drive pulley 114 connected to a driven pulley 116 on the cam shaft 104 by a belt 115. The motor 110 and reduction gear 112 are supported on the base 16 by means of a plate 118 mounted on the walls 20. The motor 110 is run continuously and a brake 120 and a clutch 121 are used to connect the motor 110 to the reduction gear 112. The brake 120 is normally engaged and clutch 121 is normally disengaged. Whenever a cycle of motion of the tool holders 22 and 24 is initiated, the brake 120 is disengaged and the clutch 121 engaged to drive the reduction gear. Means can be provided on the turntable 14 for initiating the operation of the motor 110. Such means can include a switch 125 actuated by a cam 127 each time a workpiece is moved to the work station.

The cam 102 is shown as a single cam having a contour 108 which provides sequential actuation of the tool holders 22 and 24. However, it is within the contemplation of this invention to use one or more cams having different contours to control the cycles of motion of the tool holders 22 and 24. It should be noted that the levers 58 and 60 are mounted on a common pivot 62 and are located in laterally spaced planes. The cam 102 therefore can consist of a single disc having different contours cut on laterally spaced portions of its outer periphery or the cam 102 may consist of two different plates having different contours, one of the plates being positioned to engage the cam roller 106 on lever 58 and the other plate being positioned to engage the cam roller 106 on lever 60. Since the cam can be contoured to provide a specific operation for each of the tool holders, the apparatus, as a whole, is capable of virtually an infinite number of variations in its cycles of motion.

In operation, the motor 110 is allowed to run continuously. The clutch 121 is disengaged and the brake 120 is engaged until a workpiece 12 is indexed to the work station adjacent the apparatus 10. A cycle of operation is initiated when the workpiece 12 reaches the work station. This is accomplished by disengaging the brake 120 and engaging the clutch 121 to allow the motor 110 to drive the reduction gear 112. The cam 102 is rotated through one complete revolution to complete the cycle of operation of the tool holders 22 and 24. After the cam 102 has made a complete revolution, the brake is engaged and the clutch disengaged to stop the cam 102 until another workpiece 12 is moved to the work station adjacent the apparatus 10. Although the cam 102 is shown having a contour to provide a single cycle of operation for each complete revolution of the cam, it is possible to provide any number of cycles of operation in one complete revolution of the cam and to stop the cam after each cycle is completed.

Means can be provided to produce a dwell time in each cycle of operation, if the machining operation or the assembling operation being performed requires a longer period of time to complete the operation. Such means is in the form of a second cam or auxiliary cam 122 mounted on the cam shaft 104 and a switch actuated timer 126. The auxiliary cam 122 is positioned to engage the timer 126 which is connected to disengage the clutch 121 and engage the brake 120 to stop the motion of the cam 102 until the preset time on the timer is completed. The timer then automatically re-engages the clutch and disengages the brake to allow the cam 102 to complete the cycle of motion.

A switch 126 and cam 122 may also be the means for stopping the unit at the end of a cycle whether or not a dwell is provided. If it is, a separate switch 126 may be provided at the appropriate location respecting cam 122 or cam 122 may be provided with a second surface to actuate a single switch 126. The timer described above may be used if timed operation is desired, or a switch responsive to indexing of a new part into the work station may be wired to bypass switch 126, or a manual bypass switch may be used for starting. Other arrangements may be used.

While the best known embodiment has been described, details of our device may be changed without departing from our invention. Also, while an assembly line including multiple units is described, other types of assembly lines or single units as shown in the drawing are within our invention.

What is claimed is:

1. An apparatus for moving tools to perform an operation on a workpiece, said apparatus comprising:
   a tool holder adapted to hold a part transferring tool, a part assembling tool, or a shape modifying tool,
   a tool in said holder,
   means for translating said tool holder in a first direction to cause said tool to perform an operation,
   an air spring operatively connected to said translating means in a manner to provide a working force for said tool holder,
   means for retracting said translating means and for building up a working force in said air spring, said retracting means including a cam and a motor driving said cam through one cycle for each cycle of tool movement, a second tool holder adapted to hold a part transferring tool, a part assembling tool, or a shape modifying tool, a second tool in said second tool holder, second means for translating said second tool holder in a second direction to complete an operation, and a second air spring operatively connected to said second means in a manner to provide a working force to drive said second means in said second direction, said retracting means including means for retracting said second translating means and for building up a working force in said second air spring, each of said first and second translating means including a first lever having one end operatively connected to said tool holder, the other end being operatively connected to said air spring, a pivot for each of said levers and cam follower means between each said pivot and said tool holder comprising part of said retracting means, said cam and cam follower being further adapted to remain continuously in contact during the working stroke following the retracting stroke to positively control the movement of the tool toward the workpiece, away from the workpiece, and during dwell time in said working and retracting strokes, said strokes of said tools being interrelated to operate on a single workpiece in each cycle.

2. An apparatus according to claim 1 including switch means adapted to automatically interrupt the rotation of the cam in said retracting means to provide dwell time in the motion of said first and second tool holders.

3. An apparatus according to claim 1 including means for sequentially translating workpieces to and from a work station, and means automatically initiating the operation of said motor in timed sequence with the movement of said workpieces.

4. An apparatus according to claim 1 wherein said retracting means includes a clutch and brake operatively connected to said motor, said retracting means further including means adapted to disengage said clutch and actuate said brake in at least one preselected portion of a working cycle of said cam.

5. An apparatus according to claim 3 further including cam operated means for providing dwell time in each cycle of motion of said motor, said cam operated means including an auxiliary cam operatively connected to said cam:

a switch, a cam follower adapted to follow said auxiliary cam and to actuate said switch when said cam follower reaches a preselected portion of said cam, and a switch actuated timer actuated by said switch.

References Cited
UNITED STATES PATENTS

| | | | |
|---|---|---|---|
| 3,063,139 | 11/1962 | Maximoff et al. | 29—208 I |
| 2,541,737 | 2/1951 | Bardsley et al. | 83—586 X |
| 3,273,434 | 9/1966 | Hausman et al. | 83—590 X |

WILLIAM S. LAWSON, Primary Examiner

Z. R. BILINSKY, Assistant Examiner

U.S. Cl. X.R.

29—208